United States Patent

Baba

[11] 4,275,676
[45] Jun. 30, 1981

[54] AUTO-STEERING SYSTEM

[75] Inventor: Michiru Baba, Hamamatsu, Japan

[73] Assignee: Nippon Gakki Seizo Kabushiki Kaisha, Japan

[21] Appl. No.: 889,232

[22] Filed: Mar. 23, 1978

[30] Foreign Application Priority Data

Mar. 11, 1977 [JP] Japan .............................. 52-38711[U]
Apr. 5, 1977 [JP] Japan .............................. 52-41665[U]

[51] Int. Cl.³ ............................................ B63H 25/00
[52] U.S. Cl. .................................. 114/144 E; 318/588
[58] Field of Search ................... 114/144 E; 180/79.1;
244/175; 307/234, 247 A; 318/353, 588;
328/111, 112, 165; 364/432, 457

[56] References Cited

U.S. PATENT DOCUMENTS

| | | | |
|---|---|---|---|
| 3,131,340 | 4/1964 | Johnson et al. | 114/144 E X |
| 3,280,781 | 10/1966 | Koerner | 114/144 E |
| 3,505,577 | 4/1970 | Hirokawa | 114/144 E X |
| 3,662,243 | 5/1972 | Cavil et al. | 114/144 E UX |
| 3,689,846 | 9/1972 | Naeyaert | 307/234 X |
| 3,696,282 | 10/1972 | Hirokawa et al. | 114/144 E X |
| 3,919,961 | 11/1975 | McDougal | 114/144 E |
| 4,103,638 | 8/1978 | Fowler | 114/144 E |
| 4,134,026 | 1/1979 | Sone et al. | 307/247 A X |

OTHER PUBLICATIONS

Zugay, M. L., "Circuit for Eliminating Contact Bounce," Western Electric Technical Digest, No. 26, Apr. 1972, p. 69.

Primary Examiner—Trygve M. Blix
Assistant Examiner—Reinhard J. Eisenzopf
Attorney, Agent, or Firm—Ostrolenk, Faber, Gerb & Soffen

[57] ABSTRACT

In an auto-steering system for boats and cruisers having, in each of the starboard and port motor drivers, a comparator and a motor driver circuit in series with each other. The level of the reference voltage to be applied to the comparator is adjusted in accordance with changes in the environmental conditions during sailing of the boat in order to selectively raise or lower the control accuracy of the system and, when further required, the drive circuit takes the form of a lowpass filter of a selected time constant so that the system is made irresponsive to the so-called chattering deviation of the boat sailing course. Not only great saving in the power consumption but also remarkable reduction in malfunction of the mechanical and electrical parts while assuring macroscopic following of the boat along the prescribed navigation course.

4 Claims, 8 Drawing Figures

AUTO-STEERING SYSTEM

BACKGROUND OF THE INVENTION

The present invention relates to an improved auto-steering system, and more particularly relates to improvements in the responsiveness of an auto-steering system having starboard and port motor drivers for rudders of small boats and cruisers.

The navigation mode of a boat is greatly influenced by environmental factors such as navigation course, wind heading and direction of tideway. An auto-steering system is in general accompanied by a sensor circuit including finders adapted for detecting changes, i.e. deviations from the standards, in the above-described factors, and generative of deviation signals corresponding to such changes. The signals are passed to a feedback control circuit in order to cause corresponding rotation of a rudder driver motor, thereby turning the rudder in such a fashion as to compensate for the above-described deviations. Taking the navigation course for example, the deviation signal is generated when the change in the navigation course is purposely carried out and when the change results from any unexpected causes. The present invention concerns processing of the deviation signals in the latter case, i.e. unexpected deviation of the actual sailing course of a boat from the prescribed, i.e. intended, navigation course.

Under the normal condition of sailing, it is preferred that the control accuracy of the system is high enough to cause reactive control operation when the above-described unexpected deviation occurs, i.e. the system is very keenly responsive to the unexpected deviations. However, under abnormal conditions in which waves are very heavy due to storm and/or strong tideway often encountered during motion straight ahead, there is a case in which the boat macroscopically sails on the prescribed navigation course but microscopically often deviates from the prescribed navigation course. In other words, although the boat wholly follows the prescribed navigation course, it often and momentarily sails towards starboard side and port side alternately off the prescribed navigation course. When the control accuracy is too high under this condition, the system responds quite keenly even to very small deviations, thereby causing a great deal of loss in the power consumption and malfunction of relay contacts and the rudder driver motor. This is quite disadvantageous in the case of relatively small boats and cruisers on which charging of batteries is quite difficult or almost impossible to practice.

The above-described small, frequent and alternate deviations of the actual sailing course of a boat from the prescribed, i.e. intended, navigation course under the abnormal environmental conditions are called "chattering deviations".

SUMMARY OF THE INVENTION

It is one object of the present invention to provide an auto-steering system particularly suited for small boats and cruisers which assures a great deal of saving in the power consumption even during sailing under abnormal environmental conditions.

It is another object of the present invention to provide an auto-steering system particularly suited for small boats and cruisers which successfully avoids unnecessary fatigue of mechanical parts such as relay contacts and the rudder driver motor to be otherwise caused by the so-called chattering deviations.

In accordance with one preferred aspect of the present invention, the reference voltage to be applied to the comparator in each of the starboard and port motor drivers is freely adjustable in order to increase or decrease the dead zone of the system to deviation signals.

In accordance with another preferred aspect of the present invention, the motor driver circuit coupled in series to the above-described comparator takes the form of a kind of low-pass filter.

DESCRIPTION OF THE PREFERRED EMBODIMENT

Figure 1:
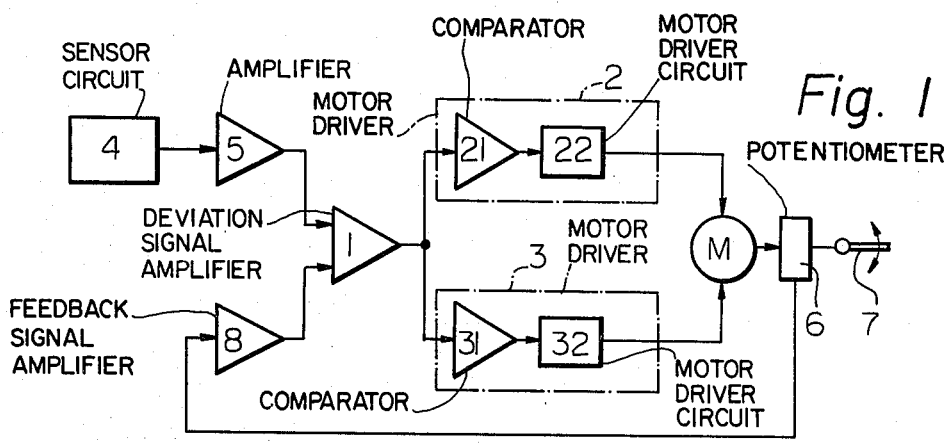
FIG. 1 is a block diagram of one embodiment of the auto-steering system in accordance with the present invention.

The outlined construction of one embodiment of the auto-steering system in accordance with the present invention is shown in FIG. 1, in which the system comprises a deviation signal amplifier 1 whose one input terminal is coupled, via an amplifier 5, to a sensor circuit 4. The sensor circuit 4 comprises one or more finders adapted for sensing environmental factors influencing the navigation mode of the boat such as navigation course, wind heading and tideway. The output terminal of the deviation signal amplifier 1 is coupled to a starboard motor driver 2 and a port motor driver 3 arranged in parallel to each other and the output terminals of these motor drivers 2 and 3 are coupled to a common driver motor M for a rudder 7 of the boat. The output terminal of the driver motor M is coupled, via a potentiometer 6 and a feedback signal amplifier 8, to the other input terminal of the above-described deviation signal amplifier 1.

The starboard motor driver 2 includes a comparator 21 and a motor driver circuit 22 in series to each other whereas the port motor driver 3 similarly includes a comparator 31 and a motor driver circuit 32.

When the boat sails fairly on the prescribed, i.e. intended, navigation course, the rudder 7 is registered at the neutral position, no input is passed to the deviation signal amplifier 1, no output is accordingly generated by the deviation signal amplifier 1, the driver motor M remains inactive and the entire system is kept in the stand-by condition.

When the actual sailing course of the boat deviates towards the starboard side or port side from the prescribed navigation course for any reasons including intended change in the navigation course, the sensor circuit 4 detects this deviation in order to pass a signal corresponding to the magnitude of the deviation to the deviation signal amplifier 1 via the intermediate amplifier 5.

Since there is no input signal from the feedback line at this stage of the process, the above-described signal from the sensor circuit 4 is outputted from the deviation signal amplifier 1 after amplification. When the deviation is on the port side, the output signal is passed to the starboard motor driver 2 whereas same is passed to the port motor driver 3 when the deviation is on the starboard side. The output from either of the drivers 2 and 3 drives the motor M for rotation so that the rudder 7 is turned to right or left in order to compensate the above described deviation of the actual sailing course from the prescribed navigation course. That is, when the deviation is, for example, on the port side, the output from the deviation signal amplifier 1 is passed to the starboard motor driver 2 and the motor M is driven for rotation in order to turn the rudder 7 to the left over an angle corresponding to the magnitude of the above-described deviation, thereby the boat starts to resume the prescribed navigation course.

It will be well understood the output from the potentiometer 6 is proportionate to the rotation angle of the driver motor M, i.e. the turning angle of the rudder 7. Thus, when the boat has completely resumed the prescribed navigation course, the rudder 7 assumes an angular position deviated from the neutral axis by an angle corresponding to the above-described rotation angle of the driver motor M. Therefore, a signal corresponding to this rudder deviation is generated by the potentiometer 6 and passed, in an inverse phase, to the deviation signal amplifier 1 via the feedback amplifier 8. When the inputs from the sensor circuit 4 and the feedback amplifier 8 becomes equal to each other in their absolute values, they offset each other due to the opposite phases, the output from the deviation signal amplifier 1 is rendered zero and the driver motor M ceases its rotation. So, the boat gradually resumes its prescribed navigation course with the rudder being kept on the deviated angular position.

As the actual sailing course of the boat approaches the prescribed navigation course, the level, i.e. the magnitude, of the signal from the sensor circuit 4 lowers gradually so that there is produced corresponding differences between the two inputs to the deviation signal amplifier 1. Taking the above-described initial port side deviation for example, signals corresponding to such differences are now passed to the port motor driver 3 so that the motor M is driven for rotation into a direction opposite to the initial rudder turning but over an equal rotation angle. This opposite rotation of the driver motor M brings the rudder 7 back to the neutral axis and driver motor M ceases rotation in order to block the rudder 7 against further turning. The above-described process is the negative feedback operation of the auto-steering system in accordance with the present invention. The process is substantially similar for starboard deviation of the actual sailing course from the prescribed navigation course.

Figure 2:
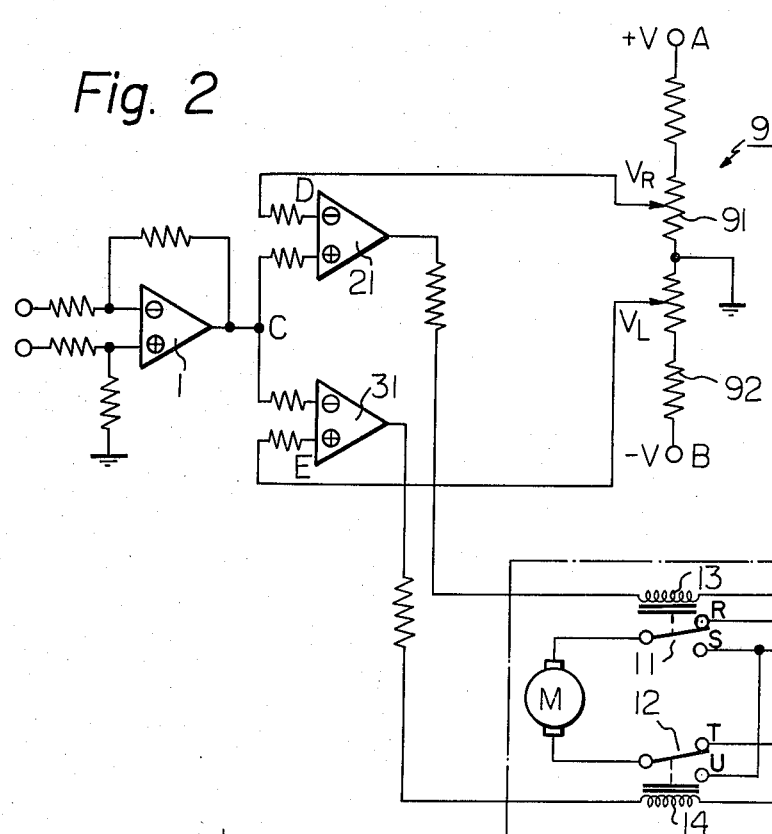
FIG. 2 is a circuit diagram of a circuit for adjusting the dead zone of the system in accordance with the present invention.

In accordance with the present invention, the comparators 21 and 31 are incorporated into the motor drivers 2 and 3 as gates shown in FIG. 2, respectively. In other words, it is intended in the present invention to adjust the width of the dead zones of the comparators 21 and 31 against the deviation signals inputted from the deviation signal amplifier 1 by adjusting the magnitude of the reference voltages to be applied to the comparators 21 and 31. The width of the dead zone will hereinafter be referred to as "the gate width".

When a certain gate width is fixed, the motor drivers 2 and 3 remain inactive against deviation signals falling within the gate width and no turning of the rudder is carried out. When a deviation signal falling out of the gate width is input, either of the motor driver 2 and 3 is rendered active in order to turn the rudder so as to compensate for the deviation represented by the input signal.

In the construction shown in FIG. 2, the output terminal C of the deviation signal amplifier 1 is coupled to a non-inversive input terminal (+) of the starboard comparator 21 and an inversive input terminal (−) of the port comparator 31 in parallel to each other. An inversive input terminal (−) of the starboard comparator 21 is coupled to one variable resistor 91 of a reference voltage source 9 whereas a non-inversive input of the port comparator 31 is coupled to the other variable resistor 92 of the reference voltage source 9. The two variable resistors 91 and 92 are coupled in series to each other, the terminal A of the variable resistor 91 is kept at an electiric potential V, the terminal B of the variable resistor 92 is kept at an electric potential-V and the connecting point between the resistors 91 and 92 is earthed.

By adjusting the resistance of the resistor 91, the electric potential $V_R$ (positive) at the inversive input terminal D of the starboard comparator 21 can be adjusted whereas the electric potential $V_L$ (negative) at the non-inversive input terminal E of the port comparator 31 can be likewise adjusted by adjusting the resistance of the resistor 92. The resistances of the two variable resistors 91 and 92 can be adjusted freely and quite independently from each other in accordance with the navigation mode.

A drive unit 10 includes the driver motor M coupled to batteries 15 via switches 11 and 12. The output terminal of the starboard comparator 21 is coupled to a relay 13 operable on the switch 11 and the output terminal of the port comparator 31 is coupled to a relay 14 operable on the switch 12. Terminals F and G of the relays 13 and 14 are kept at an electric potential −V.

Operational modes of the above-described relays 13 and 14 are as follows. When the output from the comparator 21 is positive, the relay 13 is activated so that the switch 11 comes in contact with contact S. Whereas, when the output from the comparator 21 is negative, the relay 13 remains inactive and the switch 11 remains in contact with contact R. Likewise, when the output from the comparator 31 is positive, the relay 14 is activated to put the switch 12 in contact with contact U. When the output from the comparator 31 is negative, the relay 14 remains inactive and the switch 12 remains in contact with contact T.

Figure 3:
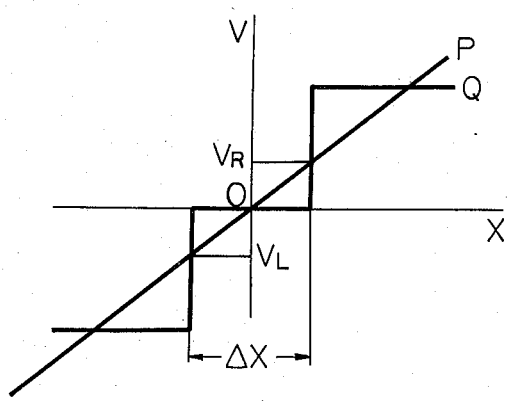
FIG. 3 is a graph for showing operation of the circuit shown in FIG. 2.

In FIG. 3, a line P represents the relationship between the output voltage V at the terminal C of the deviation signal amplifier 1 and the angular deviation X of the actual sailing course of a boat from the prescribed navigation course. A line Q represents rotational direction of the driver motor M. The starboard side deviation is given on the positive abscissa whereas the port side deviation is given on the negative abscissa.

Turning back to the construction shown in FIG. 2, it is assumed that the electric potentials at the input terminals D and E of the comparators 21 and 31 are kept at $V_R$ and $V_L$ through adjustment on the variable resistors 91 and 92.

When the boat deviates towards the starboard side from the prescribed navigation course, a deviation signal corresponding to +X is applied to the deviation signal amplifier 1 and the output terminal C of the amplifier 1 is held at an electric potential $+V_C$. This electric potential $+V_C$ is applied to the non-inversive input terminal of the starboard comparator 21. The positive electric potential $V_R$ applied to the inversive input terminal of the starboard comparator 21 is inverted into a corresponding negative electric potential $-V_R$.

When $V_C$ is larger than $V_R$, the output from the starboard comparator 21 is positive, the relay 13 is activated and the switch 11 is brought into contact with the white contact. The above-described positive electric potential $+V_C$ is applied to the inversive input terminal of the port comparator 31 also and inverted into a corresponding negative electric potential $-V_C$. The electric potential applied to the non-inversive input terminal of the port comparator assumes a negative value $-V_L$. Thus, the output from the port comparator 31 is negative, the relay 14 remains inactive and the switch 12 remains in contact with contact T. Therefore, electric current flows from the batteries 15 to the switch 11 through the switch 12 and the driver motor M, the driver motor M is driven for rotation and the rudder 7 is turned so that the boat changes its actual sailing course towards the port side in order to return to the prescribed navigation course.

When $V_C$ is smaller than $V_L$, the output from the starboard comparator 21 is negative, the relay 13 remains inactive and the switch 11 remains in contact with contact R. Since the output from the port comparator 31 is negative as explained above, the relay 14 remains inactive also and the switch 12 remains in contact with contact T. In this state, the driver motor M is electrically disconnected from the batteries 15 and does not rotate. Accordingly, no turning of the rudder 7 is effected.

When the boat deviates towards the port side from the prescribed navigation course, a deviation signal corresponding to $-X$ is applied to the deviation signal amplifier 1 and the output terminal C of the amplifier 1 is held at an electric potential $-V_C$. This electric potential $-V_C$ is applied to the inversive input terminal of the port comparator 31 and inverted into a corresponding positive electric potential $+V_C$. The negative electric potential $-V_L$ is applied to the non-inversive input terminal of the port comparator 31.

When $V_C$ is larger than $V_L$, the output from the port comparator 31 is positive, the relay 14 is activated and the switch 12 is brought into contact with contact U. The above-described negative electric potential $-V_C$ is applied to the non-inversive input terminal of the starboard comparator 21 also. The electric potential $+V_R$ applied to the inversive input terminal of the starboard comparator 21 is inverted into a corresponding negative electric potential $-V_R$. Thus, the output from the starboard comparator 21 is negative, the relay 13 remains inactive and the switch 11 remains in contact with contact R. Therefore, electric current flows from the batteries 15 to the switch 12 through the switch 11 and the drive motor M, the driver motor M is driven for rotation and the rudder 7 is turned into the direction opposite to that in the starboard side deviation so that the boat changes actual sailing course towards the starboard side in order to return to the prescribed navigation course.

When $V_C$ is smaller than $V_L$, the output from the port comparator 31 is negative, the relay remains inactive and the switch 12 remains in contact with contact T. Since the output from the starboard comparator 21 is negative as explained above, the relay 13 remains inactive and the switch 11 remains in contact with contact R. In this state, the driver motor M is electrically disconnected from the batteries 15 and does not rotate. Accordingly, no turning of the rudder 7 is effected.

As is clear from the foregoing description, the gate width $\Delta X$ (see FIG. 3) of the comparator, i.e. the dead zone of the autosteering system, can be either increased or decreased by adjusting the magnitude of the reference voltage to be applied to the comparator relative to the magnitude of the deviation signal voltage.

When the boat is liable to commit small and frequent deviations in the sailing course from the prescribed, i.e. intended, navigation course though wholly following same due to heavy waves caused by storm or strong tideway, the dead zone width is increased in order to lower the control accuracy, thereby making the auto-steering system irresponsive to such small and frequent deviations. Whereas, when the boat sails under calm environmental conditions, the dead zone width is decreased in order to raise the control accuracy, thereby making the auto-steering system responsive even to such small and frequent deviations.

In the case of the foregoing embodiment, improvement is made to the construction relating to the comparator in the motor driver in order to adjust the control accuracy of the auto-steering system as required by reference to the environmental conditions. In other words, the dead zone width of the auto-steering system is adjusted in relation to the magnitude of the deviation of the actual sailing course of the boat from the prescribed, i.e. intended, navigation course. In practice, however, not only the magnitude but also the time length of the deviation has significant influence upon the navigation mode. For example, even when the momentary magnitude of the deviation is very large, the boat can wholly follow the prescribed navigation course if the deviation lasts very shortly. Whereas, even when the magnitude of the deviation is rather small, the boat after all sails off the prescribed navigation course if the deviation lasts very long. Therefore, it is necessary to adjust the control accuracy of the auto-steering system not only in relation to the magnitude but also in relation to the time length of the deviation of the actual sailing course of the boat from the prescribed navigation course.

In another embodiment of the auto-steering system in accordance with the present invention, improvement is made to the construction relating to the motor driver circuit in order to carry out the above described adjustment of the control accuracy in relation to the time length of the deviation. This adjustment may be made either independently of or in combination with the above-described adjustment of the control accuracy in relation to the magnitude of the deviation.

In accordance with the present invention, the motor driver circuit takes the form of a filter circuit having a time constant which is defined by resistance of a resistor and capacity of a condenser. This filter circuit allows passage of deviation signals lasting longer than the time constant thereof in order to generate corresponding control signals and hinders passage of deviation signals lasting less time than the time constant thereof. In other words, the filter circuit functions as a kind of low-pass filter.

Figure 4:
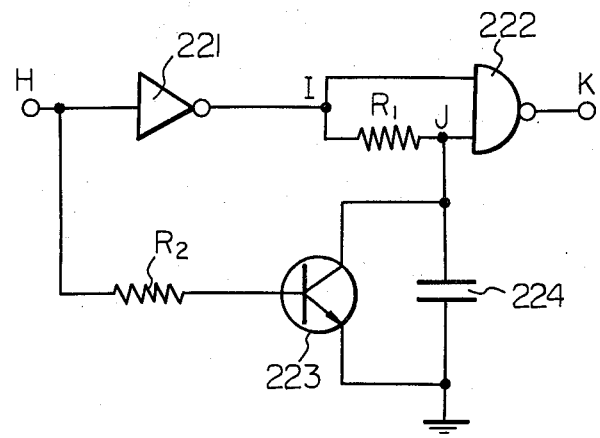
FIG. 4 is a logical operation circuit diagram of a circuit for cutting off chattering deviation signals.
Figure 5A:
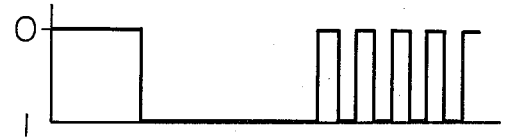
FIGS. 5A to 5D are graphs for showing operation of the circuit shown in FIG. 4.
Figure 5B:
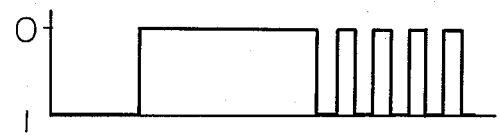
Figure 5C:
Figure 5D:
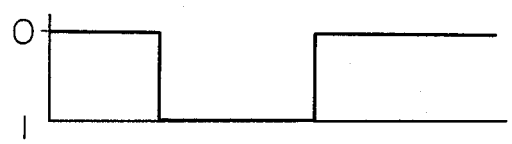

One typical embodiment of such a filter circuit is shown in FIG. 4, in which the filter circuit is assumed to be incorporated, for example, into the motor driver circuit 22 of the starboard motor driver 2 shown in FIG. 1. However, it will be well understood that the following description is fairly applicable to the filter circuit incorporated into the port motor driver circuit 32 also.

In the circuit shown, a deviation signal input terminal H is coupled, via a NOT-gate 221, to one input terminal of a NAND-gate 222 whose other input terminal is coupled, via a resistor R1, to the output terminal I of the NOT-gate 221. The reference signal input terminal H is further coupled, via a resistor R2, to the base terminal of a npn-type transistor 223, a condenser 224 is interposed between the collector terminal J and the emitter terminal of the transistor 223 and the collector terminal J of the transistor 223 is coupled to a point on a connection between the resistor R1 and the NAND-gate 222. The resistor R1 and the condenser 224 form a kind of time constant circuit. The NAND-gate 222 has a control signal output terminal K on the output side thereof.

Under the normal condition, the terminals H and K are both kept at high electric potentials and, for convenience in explanation, this condition is regarded as corresponding to logic "0". That is, when no deviation signal is inputted, the deviation signal input terminal H is kept at a high electric potential and this condition is regarded as corresponding to logic "0". When no control signal is outputted, the control signal output terminal K is kept at a low electric potential and regarded as corresponding to logic "0". In conclusion, the negative logic is employed throughout this specification. Therefore, when any signal appears on the terminals H and K, the terminals H and K both kept at low electric potential and this condition is regarded as corresponding to logic "1". The above-described relationship is summarized in Table 1.

TABLE 1

| Terminal Symbol | deviation signal input terminal H | | control signal output terminal K | |
|---|---|---|---|---|
| Electric potential | | | | |
| High | Low | High | Low | |
| Logic | 0 | 1 | 0 | 1 |
| Signal | Absent | Present | Absent | Present |

The situation with absence of the deviation signal input is as follows;

As is clear from Table 1, the deviation signal input terminal H is kept at high electric potential (logic "0") and the output terminal I of the NOT-gate 221 is kept at low electric potential (logic "1"). The electric potential of the base terminal is made higher than that of the emitter terminal in the transistor 223 and the transistor 223 is accordingly made active. Therefore, the charged voltage of the condenser 224 is discharged through the transistor 223 and the electric potential at the collector terminal J is rendered almost equal to the earth's electric potential and kept at low electric potential (logic "1"). Since the terminals I and J are both kept at low electric potential (logic "1"), the control signal output terminal K of the NAND-gate 222 is kept at high electric potential (logic "0") and no control signal is produced. The above-described process is summarized in Table 2 and graphically shown on the left side in FIGS. 5A to 5D.

TABLE 2

| Terminal | Electric Potential | Logic |
|---|---|---|
| H | High | 0 |
| I | Low | 1 |

TABLE 2-continued

| Terminal | Electric Potential | Logic |
|---|---|---|
| J | Low | 1 |
| K | High | 0 |
| Transistor | Active | |
| Condenser | short-circuit/discharged | |

The situation with presence of the deviation signal input is as follows;

As is clear from Table 1, the deviation signal input terminal is kept at low electric potential (logic "1") and the output terminal I of the NOT-gate 221 is kept at high electric potential (logic "0"). The electric potential of the base terminal is made almost equal to that of the emitter terminal and the transistor 223 is accordingly made inactive. Therefore, charging of the condenser 224 initiates in accordance with the time constant defined by the resistance of the resistor R1 and the capacity of the condenser 224. The electric potential at the collector terminal J soon becomes high (logic "0"). As the NAND-gate 222 is made of semiconductors, it has its own threshold voltage. No logical operation starts until the electric potential of the terminal J exceeds the above-described threshold voltage of the NAND-gate 222 and the initial disposition is maintained.

The logic operation starts as the electric potential of the terminal J exceeds the threshold voltage. In this disposition, the terminals I and J are kept at high electric potential (logic "0"), the output terminal K of the NAND-gate 222 is kept at low electric potential (logic "1") and a control signal is outputted. This process is summarized in Table 3 and graphically shown on the middle in FIGS. 5A to 5D.

TABLE 3

| Terminal | Electrical potential | Logic |
|---|---|---|
| H | Low | 1 |
| I | High | 0 |
| J | High | 0 |
| K | Low | 1 |
| Transistor | Inactive | |
| Condenser | charge | |

As described above, the output terminal K keeps low electric potential (logic "1") so far as the charged voltage at the terminal J falls short of the threshold voltage of the NAND-gate 222 even with presence of the deviation signal input. In other words, when deviation signals such as the ones shown on the right side in FIGS. 5A to 5D and having high frequencies are inputted to the system due to chattering deviations, charging to the condenser 224 initiates but no control signal is generated instantly. As the charging proceeds and the electric potential at the terminal J reaches the threshold voltage of the NAND-gate 222, the latter is first made active in order to generate the control signal. So far as no control signal is generated, the driver-motor for the rudder remains at a standstill and no turning of the rudder is effected.

In the case of this embodiment, a NAND-gate 222 is used for an element generative of the control signal for the rudder driver motor. Alternatively, an AND-gate may be used for same purpose. The process condition with absence of the deviation signal input in this case is summarized in Table 4 whereas that with presence of the deviation signal input is shown in Table 5.

TABLE 4

| Terminal | Electric potential | Logic |
| --- | --- | --- |
| H | High | 0 |
| I | Low | 1 |
| J | Low | 1 |
| K | Low | 1 |
| Transistor | active | |
| Condenser | Short-circuit/discharge | |

TABLE 5

| Terminal | Electric potential | Logic |
| --- | --- | --- |
| H | Low | 1 |
| I | High | 0 |
| J | High | 0 |
| K | High | 0 |
| Transistor | inactive | |
| Condenser | charge | |

In this case, the deviation signal input terminal H is kept at high electric potential (logic "0") under the normal condition and at low electric potential (logic "1") upon passage of the deviation signal. In contrast to this, the control signal output terminal K is kept at low electric potential (logic "1") under the normal condition but at high electric potential (logic "0") upon generation of the control signal.

In accordance with the above-described aspect of the present invention, a logic-gate made of semi-conductors and for controlling the rudder driver motor is placed under control by a time constant circuit in order to delay the operational timing of the logic-gate, thereby making the auto-steering system irresponsive to the so-called chattering deviations.

In accordance with the whole aspect of the present invention, the control accuracy, i.e. the dead zone width of the auto-steering system can be optionally adjusted in accordance with changes in the environmental conditions during navigation of the boat. Thus, a great deal of saving in the power consumption necessary for steering operation can be expected. This is particularly advantageous in the case of rather small boats and cruisers on which charging of batteries is very difficult to practice. In addition, as the auto-steering system can be rendered fairly irresponsive to the so-called chattering deviation of the actual sailing course of the boat from the prescribed, i.e. intended, navigation course, malfunctions otherwise caused by too frequent operation of relay contacts and the driver motor for rudder can be quite successfully avoided in addition to saving in the power consumption. Further, even when the auto-steering system is rendered irresponsive to small and/or chattering deviations, it is assured that the boat wholly sails on the prescribed navigation course.

I claim:
1. An improved auto-steering system, comprising:
   (A) a sensor circuit means for detecting changes in environmental conditions and generating electrical signals representative thereof;
   (B) a deviation signal amplifier having an output terminal and first and second input terminals, said first input terminal being coupled to said sensor circuit means, for amplifying said signals;
   (C) starboard and port motor drivers coupled in parallel with each other and coupled to said output terminal of said deviation signal amplifier, each of said motor drivers comprising a comparator and a motor driver circuit coupled in series and having an output terminal;
   (D) a drive motor for a rudder, coupled to said output terminals of said motor drivers;
   (E) a potentiometer interposed between said drive motor and said rudder and having an output terminal coupled to said second input terminal of said deviation signal amplifier;
   (F) means for adjusting the reference voltages to be applied to said comparators; and
   (G) each of said motor drivers being a low-pass filter circuit comprising:
      (1) resistor means;
      (2) capacitor means, the time constant of said low-pass filter circuit being defined by the resistance of said resistor means and the capacitance of said capacitor means;
      (3) an input terminal;
      (4) a NOT-gate having an input coupled to said input terminal;
      (5) a transistor whose base terminal is coupled to said input terminal, said capacitor means being interposed between the collector and emitter terminals of said transistor;
      (6) an element generative of control signals having one input terminal directly coupled to said NOT-gate and having another input terminal coupled, via said resistor means, to said NOT-gate; and
      (7) said collector terminal of said transistor being coupled to said other input terminal of said element.

2. An improved auto-steering system as claimed in claim 1 in which said transistor is of a npn-type.

3. An improved auto-steering system as claimed in claim 1 in which said element is a NAND-gate.

4. An improved auto-steering system as claimed in claim 1 in which said element is an AND-gate.

* * * * *